United States Patent Office 3,245,692
Patented Apr. 12, 1966

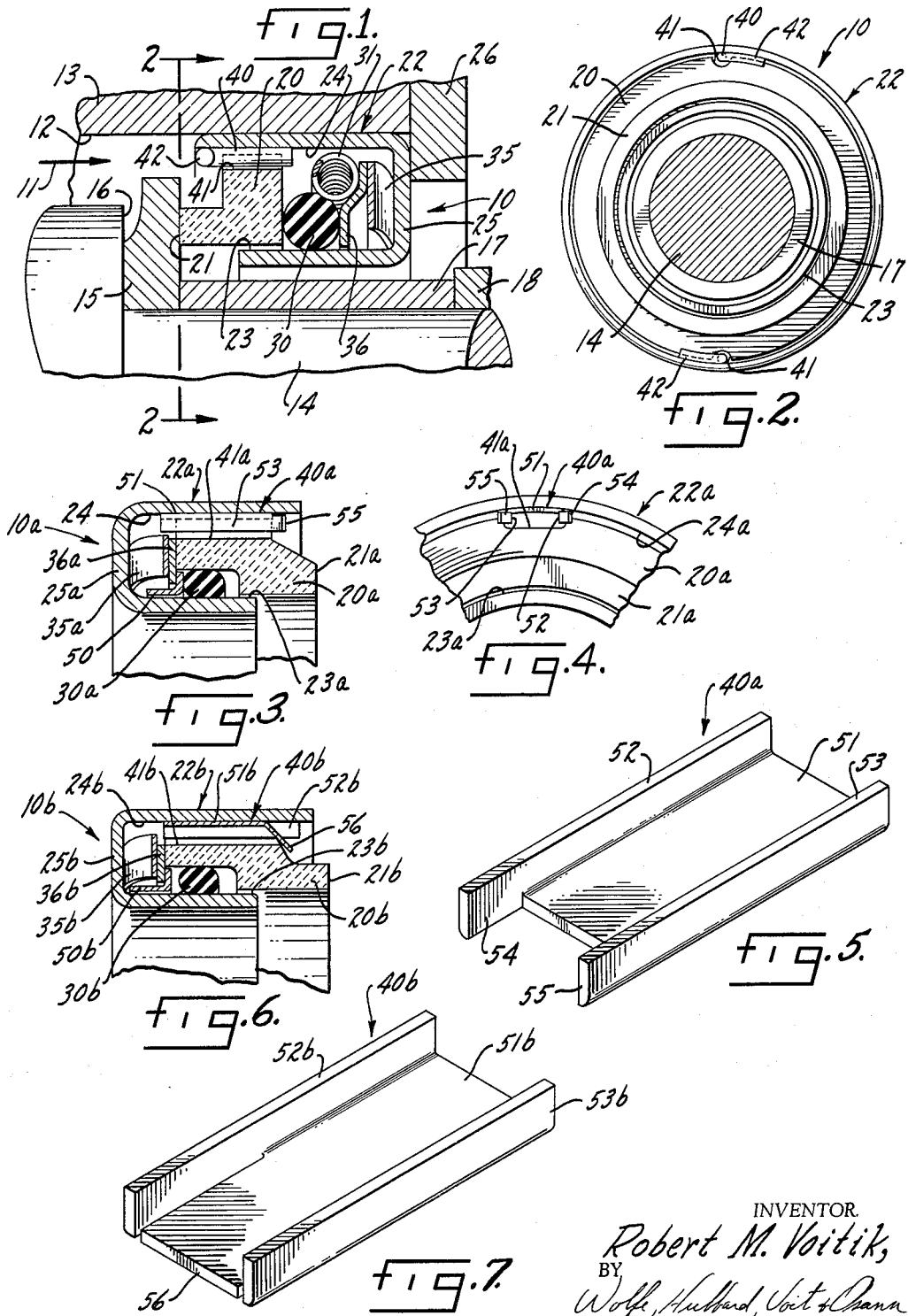

3,245,692
STATOR ANCHOR FOR ROTARY FACE SEALS
Robert M. Voitik, Evanston, Ill., assignor to Continental Illinois National Bank and Trust Company of Chicago
Filed Aug. 20, 1962, Ser. No. 217,940
3 Claims. (Cl. 277—40)

This invention relates generally to rotary face seals and concerns, more particularly, a stator assembly for such seals.

The primary aim of the present invention is to provide an improved arrangement for anchoring the stator of a rotary face seal against rotation relative to the case in which the stator is mounted.

In more detail, it is an object of the invention to provide a rotary seal in which stator "hang-up" is avoided and which permits rapid and convenient removal of the stator from its case for inspection or servicing.

Another object is to provide a seal of the above character in which the stator is locked in its case and anchored against rotation without machining the case for this purpose or interruping the periphery of the case.

It is also an object to provide a seal as described above which is particularly well suited for economical, reliable manufacture, even when fabricating small seals whose total diameter may be less than one inch.

Other objects and advantages of the invention will become apparent upon reading the following detailed description and upon reference to the drawings, in which:

FIGURE 1 is a fragmentary longitudinal section through a shaft and housing assembly including a seal embodying the invention;

FIG. 2 is a reduced scale, elevation of the complete seal shown in FIG. 1 as seen approximately along the line 2—2 in that figure;

FIG. 3 is a fragmentary longitudinal section of an modified seal also embodying the invention;

FIG. 4 is a fragmentary end elevation of the seal shown in FIG. 3;

FIG. 5 is an enlarged perspective of an element embodied in the seal shown in FIGS. 3 and 4;

FIG. 6 is a section similar to FIG. 3 showing a further embodiment of the invention; and FIG. 7 is a perspective similar to FIG. 4 showing an element embodied in the FIG. 6 modification.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Turning first to FIG. 1, there is shown a rotary shaft assembly including a rotary seal 10 constructed in accordance with the invention. The seal 10 restricts fluid leakage in the direction of an arrow 11 through an opening 12 between a housing 13 and a relatively rotatable shaft 14. The seal 10 is of the face seal type and includes a rotor 15, locked to the shaft 14 against a shoulder 16 by sleeves 17 and 18, which cooperates with an annular stator 20 having a flat, lapped sealing surface 21 that engages the rotor 15.

The stator 20 is mounted in a cartridge case 22 which is an annular unit having opposed inner and outer cylindrical walls 23 and 24, respectively, between which the stator is loosely fitted. Preferably, the case 22 is formed as a single piece with an integral annular portion 25 spacing the opposed walls 23, 24. The case 22 thus permits the stator portion of the seal 10 to be handled as a unit and encloses and protects those elements of the seal which cooperate with the annular stator 20. The case 22 is sealed in the opening 12 and locked in place by a plate 26 which is secured to the housing 13.

A resilient sealing member preferably in the form of an O-ring 30 is fitted about the wall 23 adjacent the rotor 20, and the O-ring 30 is firmly pressed both against the wall 23 and the stator so as to bias the sealing surface 21 against the rotor 15 and also provide a seal between the stator and the case 22. For pressing the O-ring 30 against the inner wall 23, a garter spring 31 is expanded about the O-ring so as to exert a compressive force squeezing the O-ring about the wall 23. In the illustrated construction, the garter spring 31 is formed of a length of helical spring having its ends secured together to form an annular unit.

To urge the O-ring 30 against the stator 20, an annular wave spring 35 is interposed between the case portion 25 and the O-ring 30. In the illustrated construction, an annular washer 36 is interposed between the wave spring 35 and the O-ring 30 so as to transmit the force of the wave spring 35 to the O-ring and also guide the garter spring 31 against the O-ring.

In keeping with the invention, the stator 20 and the case 22 are locked against relative rotation, and the stator is held in the case, by a flexible anchor member 40 secured in an axially disposed relation to the outer wall 24 and received in a notch 41 formed in the outer periphery of the stator 20. In the FIGS. 1 and 2 embodiment, the member 40 is a short length of wire, and a pair of wires 40 and cooperating notches 41 are disposed on opposite sides of the stator. As will be evident, the wires 40 form lugs which key the stator 20 to the surrounding case 22 and positively prevent relative rotation.

Preferably, the flexible anchor member wires 40 extend the full length of the stator 20 so that the stator cannot twist slightly and "hang-up," that is, become jammed against axial movement under the force of the spring 35. The outer ends 42 of the wires 40 are left unsecured to the case 22 and define tabs which are bent at angles to the notches 41 so as to block movement of the stator from the case 22. Thus, the wires 40 not only prevent relative rotation between the stator 20 and the surrounding case 22, but also lock the stator within the case.

It will be appreciated that the wires 40 make unnecessary any machining of the case 22 to turn down an outer edge for the purpose of holding the stator within the cartridge case. It can also be seen that the periphery of the case is left in uninterrupted, substantially cylindrical form so that a good seal is maintained between the case 22 and the housing 13 within which the case is mounted. Disassembly of the stator 20 from the case 22 for inspection or servicing of the seal is quite easy since, by bending the ends 42 of the wires 40 outwardly of the case 22, the stator 20 can be easily slipped from the case. Replacing the stator and again bending the ends 42 of the wires 40 relocks the stator within the case.

A modification of the invention is shown in FIGS. 3, 4 and 5 wherein parts corresponding to those previously described have been given the same reference numerals with the distinguishing suffix a added. Hence, there is illustrated a seal 10a including a stator 20a having a sealing face 21a and being mounted within a case 22a having opposed walls 23a and 24a separated by an annular section 25a. An O-ring 30a is interposed between the stator 20a and the wall 23a so as to define a secondary seal. An annular wave spring 35a acts through a washer 36a to bias the sealing surface 21a from the case 22a. In addition, a flanged retainer 50 is fitted between the washer 36a and the O-ring 30a so as to hold the O-ring in position.

The seal 10a includes a flexible anchor member 40a which takes the form of a channel having a back 51 and generally parallel sides 52 and 53 (see FIG. 5). The back 51 of the channel 40a is secured to the wall 24a so that the sides 52, 53 extend into a notch 41a formed in the periphery of the stator 20a. The channel 40 thus forms a lug which keys the stator 20a to the surrounding case 22a and positively prevents relative rotation between the parts. The outer end of the channel back 51 is cut away so that the ends of the sides 52, 53 define tabs 54 and 55, respectively, which are spread slightly to block movement of the stator from the case.

It has been found that the channels 40a can be quite easily and economically formed and that the flat surface afforded by the channel back 51 expedites securing of the anchor member channel to the seal wall 24a. In a small rotary seal, the total width of the channel 40a may be only 1/8 inch, and it can thus be seen that the relatively flat surface 51 greatly facilitates the welding or gluing operation which might be utilized to secure the channel in place.

A further modification of the invention is shown in FIGS. 6 and 7 wherein parts corresponding to those previously described have been given the same reference numeral with the distinguishing suffix b added. There is shown in these figures a seal 10b corresponding quite closely to the previously described seal 10a and which includes a stator 20b mounted loosely within a case 22b. A flexible anchor member 40b is secured to a wall 24b of the case 22b so as to extend into a peripheral notch 41b formed in the stator 20b and lock the stator against relative rotation with respect to the case 22b. The anchor member channel 40b includes a back 51b and a pair of integral parallel sides 52b and 53b. In this embodiment, the outer end of the back 51b is left unsecured to both the case 22b and to the sides 52b, 53b so as to define a tab 56 which is bent from the case wall 24b to lock the stator 20b within the case. It can therefore be seen that the channel 40b locks the stator 20b against movement from the case 22b and against relative rotation within the case.

I claim as my invention:

1. A rotary seal assembly comprising, in combination, an annular cartridge case defining a cylindrical wall, an annular stator loosely positioned adjacent said wall and within said case, said stator having a sealing surface adapted to extend from said case, a channel member formed of flexible material and having a back and generally parallel sides, said member having its back secured in axially disposed relation to said wall, said stator having a notch receiving said sides so as to lock the stator and said case against relative rotation, said member having an outer end unsecured to said case and bent at an angle to said notch so as to block movement of said stator from said case, and means biasing said sealing surface outwardly of said case.

2. A rotary seal assembly comprising, in combination, an annular cartridge case defining a cylindrical wall, an annular stator loosely positioned adjacent said wall and within said case, said stator having a sealing surface adapted to extend from said case, a channel member formed of flexible material and having a back and generally parallel sides, said member having its back secured in axially disposed relation to said wall, said stator having a notch receiving said sides so as to lock the stator and said case against relative rotation, said channel having the outer end of its back cut away so that the outer ends of said sides define tabs, said tabs being spread at an angle to said notch so as to block movement of said stator from said case, and means biasing said sealing surface outwardly of said case.

3. A rotary seal assembly comprising, in combination, an annular cartridge case defining a cylindrical wall, an annular stator loosely positioned adjacent said wall and within said case, said stator having a sealing surface adapted to extend from said case, a channel member formed of flexible material and having a back and generally parallel sides, said member having its back secured in axially disposed relation to said wall, said stator having a notch receiving said member so as to lock the stator and said case against relative rotation, said channel member having an outer end of its back unsecured to said case and separated from the adjacent sides to define a flexible tab, said tab being bent from said wall at an angle to said notch so as to block movement of said stator from said case, and means biasing said sealing surface outwardly of said case.

References Cited by the Examiner
UNITED STATES PATENTS

| | | | |
|---|---|---|---|
| 1,027,565 | 5/1912 | Ramage | 277—189 X |
| 2,399,764 | 5/1946 | Schilling | 277—86 |
| 2,593,899 | 4/1952 | Krug | 277—38 |
| 2,717,790 | 9/1955 | Chambers et al. | 277—42 |
| 2,857,182 | 10/1958 | Bain et al. | 277—87 X |
| 2,882,076 | 4/1959 | Laser et al. | 277—38 |
| 3,193,298 | 7/1965 | Voitik et al. | 277—87 X |

LAVERNE D. GEIGER, *Primary Examiner.*

SAMUEL B. ROTHBERG, *Examiner.*